United States Patent
Herkes et al.

(10) Patent No.: US 9,355,238 B2
(45) Date of Patent: May 31, 2016

(54) SECURE AUTHENTICATION AT A SELF-SERVICE TERMINAL

(75) Inventors: Colin Herkes, Fife (GB); Michael J. Neilan, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/787,654

(22) Filed: May 26, 2010

(65) Prior Publication Data
US 2011/0296194 A1    Dec. 1, 2011

(51) Int. Cl.
*H04L 29/00*     (2006.01)
*G06F 21/34*     (2013.01)

(52) U.S. Cl.
CPC ........ *G06F 21/34* (2013.01); *G06F 2221/2101* (2013.01); *G06F 2221/2113* (2013.01); *G06F 2221/2149* (2013.01)

(58) Field of Classification Search
USPC .............................. 713/185; 709/225; 235/441
See application file for complete search history.

(56) References Cited

U.S. PATENT DOCUMENTS

| | | | |
|---|---|---|---|
| 6,282,612 B1* | 8/2001 | Sakajiri et al. | 711/115 |
| 7,161,465 B2* | 1/2007 | Wood et al. | 340/5.2 |
| 7,941,534 B2* | 5/2011 | de la Huerga | 709/225 |
| 2011/0154481 A1* | 6/2011 | Kilgore et al. | 726/19 |

* cited by examiner

*Primary Examiner* — Jeffrey Pwu
*Assistant Examiner* — Michael D Anderson
(74) *Attorney, Agent, or Firm* — Schwegman, Lundberg & Woessner (57) ABSTRACT

A method of providing secure authentication of a service user at a self-service terminal is described. The method comprises: detecting attempted access by the service user to a restricted function on the self-service terminal; ascertaining if a removable storage device is in communication with the self-service terminal; in the event that a removable storage device is not in communication with the self-service terminal, denying access to the restricted function; in the event that a removable storage device is in communication with the self-service terminal, prompting the service user to enter login credentials. The method further comprises comparing the entered login credentials with access details stored on the removable storage device; denying access to the restricted function if the entered login credentials do not comply with the access details; permitting access to the restricted function if the login credentials do comply with the access details; and storing details relating to the access.

15 Claims, 5 Drawing Sheets

| 62 | 64 |
|---|---|
| Access to Diagnostics | 4001 |
| Run device self tests | 4002 |
| View detailed fault information | 4003 |
| Access to desktop | 4004 |
| Access to Utility application | 4005 |
| Access & set ATM and device configuration | 4006 |
| Security configuration and features | 4007 |
| View event logs for all devices | 4008 |
| Run Diagnostics for all devices | 4009 |
| Obtain full self-test information for all devices | 4010 |
| Balance and settlement | 4011 |
| Software install / update | 4012 |
| Setup application utility | 4013 |
| Communications configuration | 4014 |
| EPP configuration and host authentication | 4015 |

Fig 3

| | 76 | 74 | 72 | |
|---|---|---|---|---|
| Identifier | 8541 | 6124 | - | - |
| Username | 2658 | 3254 | - | - |
| Time period | 2503 | 2010 | 0097 | - |
| Access levels | 4001 | 4002 | 4003 | 4004 |
| | - | - | 4007 | - |
| | - | - | - | - |
| | - | - | - | - |
| | - | - | - | - |

SECURE AUTHENTICATION AT A SELF-SERVICE TERMINAL

FIELD OF INVENTION

The present invention relates to secure authentication at a self-service terminal (SST).

BACKGROUND OF INVENTION

SSTs are public access devices that provide goods and/or services to customers in an unattended environment and/or in an unassisted manner. One common type of SST is an Automated Teller Machine (ATM). To ensure that ATMs remain operational, ATM vendors typically provide management software for performing settlement, diagnostic, upgrade, and maintenance tasks on the ATM. This management software is typically referred to as a supervisor application (although it may be included within the ATM's transaction application). To access the supervisor application, a servicing person (not an ATM customer) typically presses a switch that changes the ATM from transaction mode (where a customer can enter a transaction) to supervisor mode (where settlement, diagnostic and maintenance tasks can be performed).

The Payment Card Industry (PCI) has implemented a Payment Application Data Security Standard (PA-DSS) that requires ATMs (i) to restrict access to certain supervisor functions to authorised personnel, and (ii) to maintain an audit of any servicing personnel who access those restricted functions available in supervisor mode. Details of this standard are available at https://www.pcisecuritystandards.org.

Some ATM vendors comply with PA-DSS by securely storing passcodes and usernames for authorised personnel either on the ATM or remotely on a networked server.

Managing these passcodes and usernames creates a significant overhead for the ATM owners because (i) there may be a large number of authorised personnel, and (ii) authorised personnel have to be added and deleted over time.

Local storage has the disadvantage that each ATM must store an up-to-date list of authorised personnel, together with their associated passcodes. Remote storage requires the ATM's communications connection to be working before a person can be authenticated, but if the person was despatched to fix a communications problem on the ATM, then that person cannot be authenticated by that ATM since the communications connection is needed to access the remote network.

SUMMARY OF INVENTION

Accordingly, the invention generally provides methods, systems, apparatus, and software for secure authentication at a self-service terminal.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of providing secure authentication of a service user at a self-service terminal, the method comprising:

detecting attempted access by the service user to a restricted function on the self-service terminal;

ascertaining if a removable storage device is in communication with the self-service terminal;

in the event that a removable storage device is not in communication with the self-service terminal, denying access to the restricted function;

in the event that a removable storage device is in communication with the self-service terminal, prompting the service user to enter login credentials;

comparing the entered login credentials with access details stored on the removable storage device;

denying access to the restricted function if the entered login credentials do not comply with the access details;

permitting access to the restricted function if the login credentials do comply with the access details; and storing details relating to the access.

As used herein, the term "service user" refers to a person authorised to conduct maintenance, diagnostic, upgrade, administrative, and/or settlement operations on an SST. It does not refer to a customer of the SST who performs transactions at the SST. A service user may be a first line maintenance person, a second line maintenance person, a replenishment person, an authorised staff member for installing software, or the like. Maintenance operations typically include clearing jammed media, for example, printer paper jammed in a receipt printer. Diagnostic operations typically include accessing logs and tallies storing details of the number of operations performed by a module (for example, the number of receipts printed by a thermal receipt printer head). Settlement operations typically include: entering a number of banknotes that have been loaded, accessing a list of deposits executed by the ATM, and such like. Administrative operations typically include: installing software, accessing a desktop of the operating system, and such like.

The step of detecting attempted access by the service user to a restricted function on the self-service terminal may be implemented by detecting a state of a switch being changed. For example, the switch may be changed from transaction mode to supervisor mode. This switch may be changed manually (for example, by a service user depressing the switch), or automatically (for example, by a sensor detecting a door being opened to access an internal module of the self-service terminal).

The step of ascertaining if a removable storage device is in communication with the self-service terminal may be implemented by the self-service terminal detecting the removable storage device being present in a port in the terminal. The port may comprise a Universal Serial Bus (USB) port, a Secure Digital (SD) card port, a Multi-MediaCard (MMC) port, an integrated circuit card port, or the like. The terminal may define a slot for guiding the removable storage device towards the port.

Alternatively, the step of ascertaining if a removable storage device is in communication with the self-service terminal may be implemented by the self-service terminal detecting a wireless communication session with the removable storage device. The terminal may include a wireless transceiver for communicating with a wireless transceiver in the removable storage device.

The step of denying access to the restricted function (in the event that a removable storage device is not in communication with the self-service terminal) may be implemented by denying access to software that includes the restricted function. Alternatively, the step of denying access to the restricted function may be implemented by allowing access to software that includes the restriction function, but not allowing access to that restricted function.

The restricted function may comprise a plurality of restricted tasks, such as changing passwords, entering encryption keys, specifying which menu is to appear when a supervisor mode is entered, and the like. The restricted tasks may be provided as menu options.

The method may comprise the further step of receiving the access details from the removable storage device prior to the step of comparing the entered login credentials with the access details stored on the removable storage device. Alternatively, the method may comprise the further step of transmitting the entered login credentials to the removable storage device prior to the step of comparing the entered login credentials with the access details stored on the removable storage device.

The step of prompting the service user to enter login credentials may comprise prompting the service user to enter a passcode. Alternatively, the step of prompting the service user to enter login credentials may comprise prompting the service user to enter a username and a passcode combination.

The access details may comprise a unique identifier and a passcode. The login credentials may further comprise one or more access levels indicating the level of access for which the service user is authorised.

The access details may comprise a time period during which the removable storage device can be validly used. If the removable storage device is used outside of the time period (for example, after expiry of the time period), then the login credentials will not be validated even if they match those login credentials stored within the secure memory. The time period may be assigned by an administrator and selected to restrict use of the removable storage device in the event of theft or misuse thereof. The self-service terminal may include time protection routines to detect changes to a software clock on the terminal to ensure that the time period is not circumvented.

The access level(s) may relate to first level maintenance (such as clearing jammed media), second level maintenance (such as repairing or replacing faulty devices), replenishment (such as restocking the self-service terminal with media), or the like. The access level(s) may relate to individual functions that the service user is authorised to access, such as executing device self-test routines, executing diagnostic tests, viewing tallies for devices, viewing faults in status lists, viewing device status, viewing USB information, installing software, updating software configuration, and the like.

The removable storage device may include a secure memory. The removable storage device may also include control logic for ensuring that only read requests sent to the secure memory that fulfill a defined criterion can retrieve the access details from the secure memory. The defined criterion may include providing a developer identification as part of the read request that matches a developer identification stored within the secure memory.

An administration facility may include an administration file storing an association between the unique identifier (stored in secure memory in the removable storage device) and contact details (one or more of: name, address, telephone number, and the like) of the service user authorised to use the removable storage device. This administration file enables the administration facility to audit who has accessed a self-service terminal at a particular time.

The step of denying access to the restricted function (if the entered login credentials do not comply with the access details) may further comprise storing details relating to the attempted access in an event log.

The details relating to the access may include one or more of the following: a time and/or date at which the login credentials were authenticated, an identifier associated with the service user, a description of functions that were accessed, a description of changes that were made, and the like.

The step of storing details relating to the access may include storing the details in an event log. The event log may be a conventional operating system event log or a proprietary event log. The details relating to the access may be such details as are needed to comply with PCI PA-DSS requirements.

An audit of the changes made to a self-service terminal by a service user can be conducted using the administration file to identify the service user, and using the event log to ascertain what changes he/she made to the configuration of the self-service terminal.

The method may comprise the further step of decrypting the access details received from the removable storage device. The removable storage device may encrypt the access details using conventional cryptographic techniques, such as public/private key cryptography, and may provide a hash value for the transmitted access details so that the terminal can confirm that no changes have been made to the access details during or subsequent to transmission.

The method may comprise the further step, prior to the step of prompting the service user to enter login credentials (in the event that a removable storage device is in communication with the self-service terminal), of ascertaining if the self-service terminal is configured to allow a removable storage device to be used to authorise access to restricted functions. If the self-service terminal is not configured to allow a removable storage device to be used to authorise access to restricted functions (even though the self-service terminal includes a port suitable for communicating with the removable storage device), then the method may deny access to the restricted function.

According to a second aspect there is provided a computer program that, when executed on a processor, implements the steps of the first aspect.

The computer program may be embodied on a record medium in a non-transitory form, transmitted on an electrical carrier signal, or stored in a computer memory.

According to a third aspect there is provided a self-service terminal comprising: a customer display; a storage device located within the terminal; and a processor for controlling the terminal; the processor being operable to load instructions from the storage device to execute:

(a) a runtime platform operable to (i) detect attempted access by the service user to a restricted function on the self-service terminal, and (ii) ascertain if a removable storage device is in communication with the self-service terminal; and (b) a supervisor application arranged to: (i) receive login credentials from a service user, (ii) compare the received login credentials with access details stored on a removable storage device provided by the service user, (iii) permit the service user to access a restricted function of the supervisor application in the event that the received login credentials comply with the access details stored on the removable storage device, and (iv) store details relating to the service user's access.

The supervisor application may be further arranged to present an indication of an access level to the service user subsequent to the service user being authenticated.

The self-service terminal may further comprise a control application operable to provide a sequence of transaction screens to a customer to enable that customer to execute a transaction at the self-service terminal. The supervisor application may be (i) incorporated into the control application, (ii) a stand-alone application, or (iii) incorporated into another application.

The self-service terminal may further comprise a service user operator panel on which a restricted function of the supervisor application is presented. Alternatively, the service user may use the customer display to view a restricted function of the supervisor application. The service user operator panel may comprise a keypad, a service user display, and a mode switch for selecting either transaction mode or supervisor mode.

The self-service terminal may further comprise a banknote dispenser.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

The runtime platform may include a conventional driver for accessing a device of the type corresponding to the removable storage device, and a custom driver for communicating with the removable storage device using a secure protocol. The custom driver may use a developer identification corresponding to a developer identification stored in the removable storage device. The custom driver may include the developer identification when retrieving access details from the removable storage device.

The supervisor application may include a security library operable to communicate with the custom driver. The security library may be programmed as part of the supervisor application or as a separate component (such as a dynamic link library (DLL)) accessed by the supervisor application.

The security library may convert some of the retrieved access details (such as access level codes) to a format recognized by the supervisor application.

The developer identification may be stored within the custom driver or within the security library.

According to a fourth aspect there is provided a self-service terminal network comprising: a host administrator, and a plurality of self-service terminals according to the third aspect, the host administrator including a file listing a plurality of unique identifiers, each unique identifier being (i) stored within a respective removable storage device, and (ii) associated with a named individual authorised to access a restricted function on the plurality of self-service terminals.

According to a fifth aspect there is provided a method of providing secure authentication of a service user at a self-service terminal, the method comprising:

detecting attempted access by the service user to a restricted function on the self-service terminal;

ascertaining if a removable storage device is in communication with the self-service terminal;

denying access to the restricted function in the event that a removable storage device is not in communication with the self-service terminal;

in the event that a removable storage device is in communication with the self-service terminal then comparing login credentials entered by the service user with access details stored in the removable storage device, and (i) permitting access to the restricted function and (ii) storing details relating to the access.

Comparing login credentials entered by the service user with access details stored in the removable storage device may be implemented by the self-service terminal or by the removable storage device.

It will now be appreciated that these aspects allow a service user to be validated based on the contents of a removable storage device. Since the removable storage device can be assigned (given to) to a named individual, an audit log can be provided that lists who has accessed any restricted function on the terminal (based on the unique identifier and the associated named individual), thereby enabling compliance with the PCI PA-DSS standard.

For clarity and simplicity of description, not all combinations of elements provided in the aspects recited above have been set forth expressly. Notwithstanding this, the skilled person will directly and unambiguously recognise that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

BRIEF DESCRIPTION OF THE DRAWINGS

FIG. 5 is a flowchart (split over two sheets as FIGS. 5A and 5B for clarity) illustrating steps involved when a service user attempts to access a restricted function of the SST of FIG. 2;

DETAILED DESCRIPTION

Figure 1:
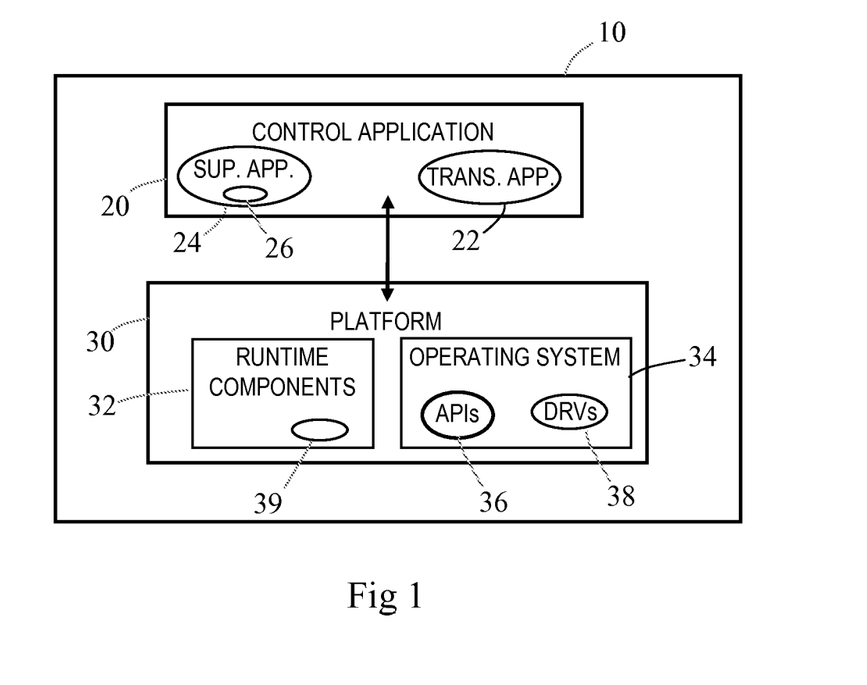
FIG. 1 is a simplified schematic diagram of an SST memory executing software components providing restricted functions according to an embodiment of the present invention.

Reference will now be made to FIG. 1, which is a simplified, schematic diagram showing an SST memory 10 executing software components according to one embodiment of the present invention. In this embodiment the SST is an ATM, and the software components comprise: a control application 20 and a runtime platform 30.

The Control Application

The Control Application 20 comprises a Transaction Application 22 and a Supervisor Application 24.

As is known in the art, the Transaction Application 22 presents a sequence of screens on an ATM display to a customer at the ATM, collates information from the customer (for example, customer account information from a customer's ATM card, transaction request, transaction amount, and the like), obtains authorisation for a transaction request from a remote authorisation host (not shown), and instructs modules within the ATM, as needed, to fulfil an authorised transaction.

As used herein, a "screen" refers to data (text and graphics) that is rendered on a display and instructions (control characters) for rendering that data. In other words, a screen is software; whereas, a display is hardware.

The Supervisor Application 24 provides settlement, administrative, diagnostic and maintenance functions for service users of the ATM. The Supervisor Application (SA) 24 is accessed by a service user selecting supervisor mode on the ATM. When this occurs, the Transaction Application 22 goes offline (after concluding any transaction currently in progress) and passes control of the modules to the SA 24.

The Supervisor Application 24 includes code a security library 26, which is described in more detail below.

The Runtime Platform

The runtime platform 30 comprises run-time components 32 and an operating system 34.

In this embodiment, the operating system is a Windows XP (trade mark) operating system, available from Microsoft Corporation (trade mark). As is well known in the art, the operating system 34 is responsible for memory, process, task, and disk management, and includes routines for implementing these functions. The operating system 34 includes a suite of application programming interfaces (APIs) 36 that are used by the Control Application 20 to call functions performed by the operating system 34 and devices controlled by the operating system 34. The operating system 34 also includes a set of drivers 38 for controlling standard computing devices (such as USB ports, disk drives, displays, and the like).

In this embodiment, the run-time components 32 are a set of APTRA (trade mark) XFS components, available from NCR Corporation, 3097 Satellite Blvd., Duluth, Ga. 30096, U.S.A. The run-time components 32 provide a range of programming facilities specific to self-service terminal devices and services.

One function of the run-time components 32 is to enhance the operating system 34 so that the operating system 34 and run-time components 32 together provide high level access to all of the devices and modules, including both standard home computing devices (via the operating system 34), and XFS computing devices (via the run-time components 32). Thus, the combination of the run-time components 32 and the operating system 34 can be viewed as providing a complete ATM operating system. XFS is the eXtensions for Financial Services client-server architecture for financial applications running on a Microsoft Windows (trade mark) platform.

The run-time components 32 include a custom driver 39 that enhances one of the drivers 38 (the driver for a USB port) to provide additional functionality, as described below.

ATM Architecture

Figure 2:
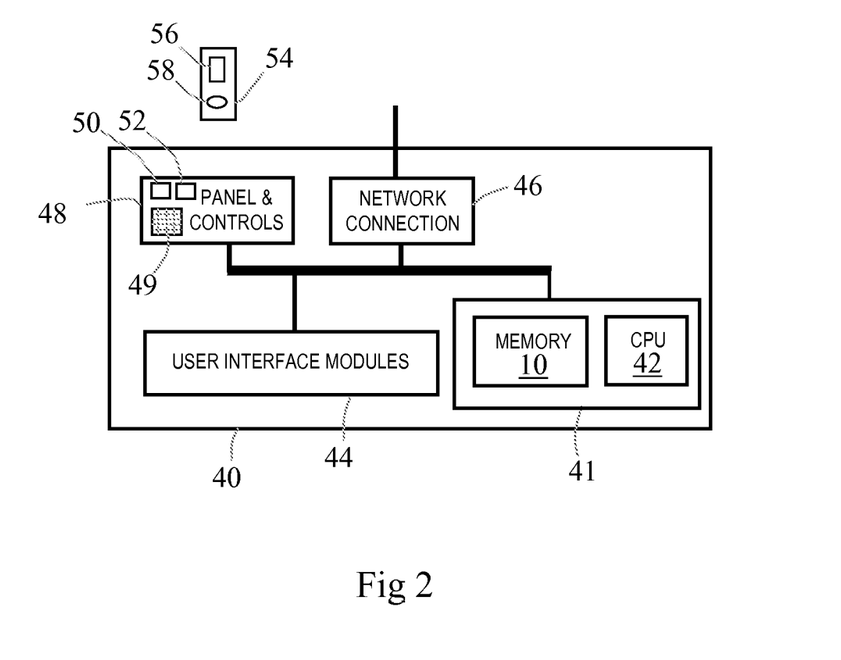
FIG. 2 is a simplified schematic diagram of an SST system, the system comprising: an SST incorporating the memory executing the software components of FIG. 1, and a removable storage device for use with the SST.

Reference will now also be made to FIG. 2, which is a simplified schematic diagram of an ATM 40 including the memory 10 executing the software components of FIG. 1.

The ATM 40 comprises: a controller module 41 (including, inter alia, a central processing unit (CPU) 42 coupled to the memory 10); a plurality of user interface modules 44 (not shown in detail, but including a cash dispenser, a card reader, a customer display, a receipt printer, an encrypting keypad, and the like); a network connection module 46; and a service user operator panel 48.

The network connection module 46 enables the ATM 40 to communicate with a remote authorisation host (not shown) for authorising transactions requested by an ATM customer.

The service user operator panel 48 enables information to be retrieved from, and diagnostic tests to be performed on, the modules 41, 44, 46 within the ATM 40. The service user operator panel 48 also enables a service user to configure the Control Application 20.

The service user operator panel 48 includes a numeric keypad 49, a reset switch (not shown) for resetting the ATM 40, a physical mode switch 50 for switching the ATM 40 between transaction mode and supervisor mode, and a data port 52 in the form of a USB socket for receiving a removable storage device 54 in the form of a secure USB drive.

The secure USB drive 54 comprises secure storage 56 and secure communication software 58. The secure communication software 58 supports industry-standard encryption. Encryption relates to (i) encrypted communications with the ATM 40 (using conventional asymmetric cryptography in this embodiment) and (ii) encrypted storage of data in the secure storage 56 (using symmetric cryptography, AES 128 in this embodiment).

Figure 3:
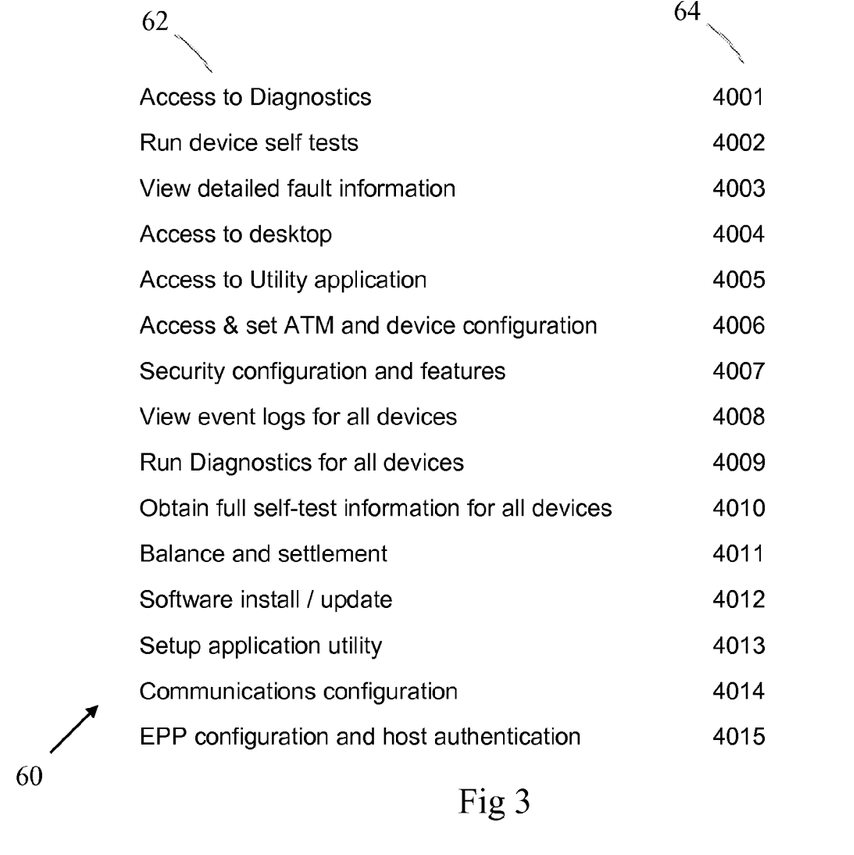
FIG. 3 is a table listing typical service user functions and access level codes associated with those functions.
Figure 4:
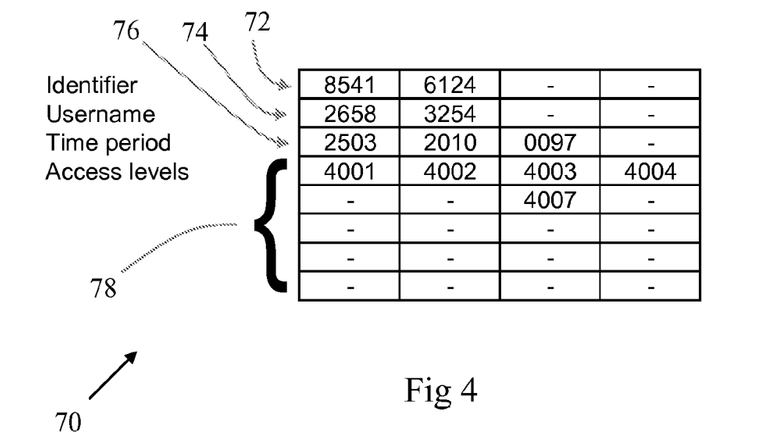
FIG. 4 is a table illustrating various codes, including the access level codes of FIG. 3, stored in the removable storage device of FIG. 2.

Reference will now be made to FIGS. 3 and 4. FIG. 3 is a table 60 listing typical service user functions (shown in column 62) and access level codes (shown in column 64) associated with those functions. FIG. 4 is a table 70 illustrating various codes stored in the removable storage device 54. Table 70 shows thirty-two cells, each storing four digits.

As shown in FIG. 4, the secure storage 56 stores access details. These access details comprise: a unique identifier 72 for the secure USB drive 54, a username 74 of the service user who is authorised to use that secure USB drive 54, a time period 76 during which the secure USB drive 54 is valid, and access levels 78 for the service user who is authorised to use that secure USB drive 54.

In this embodiment, the unique identifier 72 comprises eight digits, namely "85416124". The first four digits ("8541") comprise a unique reference for the secure USB drive 54 (that is, a unique serial number). The second four digits ("6124") comprise a developer identification. This developer identification is also stored in the ATM 40 (in the security library 26) and must be provided in any read request sent to the secure USB drive 54. If the developer identification sent by the ATM 40 does not match the developer identification stored on the secure USB drive 54, then that secure USB drive 54 cannot be used to access restricted functions on that ATM 40. Thus, the first four digits are unique for each secure USB drive 54, but the last four digits are common for all secure USB drives 54 that are authorised to access the ATM 40.

In this embodiment, the username 74 also comprises eight digits ("26583254") covering two cells. Part of this username 74 (the last six digits) also serves as the passcode that the service user has to enter to gain access to the ATM 40, as described below.

The time period 76 comprises up to sixteen digits, but only the first twelve digits are used in this embodiment. The first eight digits indicate the day, month, and year (in that order) on which the secure USB drive 54 is valid, and the next digits indicate the number of days from that date during which the secure USB drive 54 is valid. In this embodiment, the time period 76 is "250320100097", which indicates that the secure USB drive 54 is valid from 25 Mar. 2010 for ninety-seven days.

In this embodiment, each cell of the access levels 78 (of which there are twenty) can contain an individual access level code from column 64 of table 60. As shown in table 60, each individual access level code is associated with a service user function (shown in column 62). If an individual access level code is not present in table 70, then the associated service user function cannot be accessed by the holder of the secure USB drive 54.

In FIG. 4, there are five individual access level functions present. For example, individual access level function "4002" enables the service user to execute (nm) device self-tests on the ATM 40; and individual access level function "4007" enables the service user to configure security options and features on the ATM 40.

The secure USB drive 54 is issued to an approved service user by an administration facility. This administration facility maintains a file listing the service user's name and contact details (for example, telephone number, email, and address of employer) together with the access details for that service user.

The access levels provided to a service user are assigned by an administrator (which may be a person or a computer) within the administration facility based on the role of the service user (for example, replenisher, second line maintenance) and the functions provided by the SST that are needed to fulfil that role.

ATM Operation

The ATM 40 can operate in one of two modes: transaction mode and supervisor mode.

Supervisor Mode

In supervisor mode, a service user can launch the Supervisor Application 24 to execute maintenance, administrative, diagnostic, and/or settlement tasks. When the service user has completed this, then he/she can exit the Supervisor Application 24 by pressing the mode switch 50 to return control of the modules 44, 46 to the Transaction Application 22. This is referred to as returning to transaction mode.

Operation of ATM in Supervisor Mode

Figure 5A:
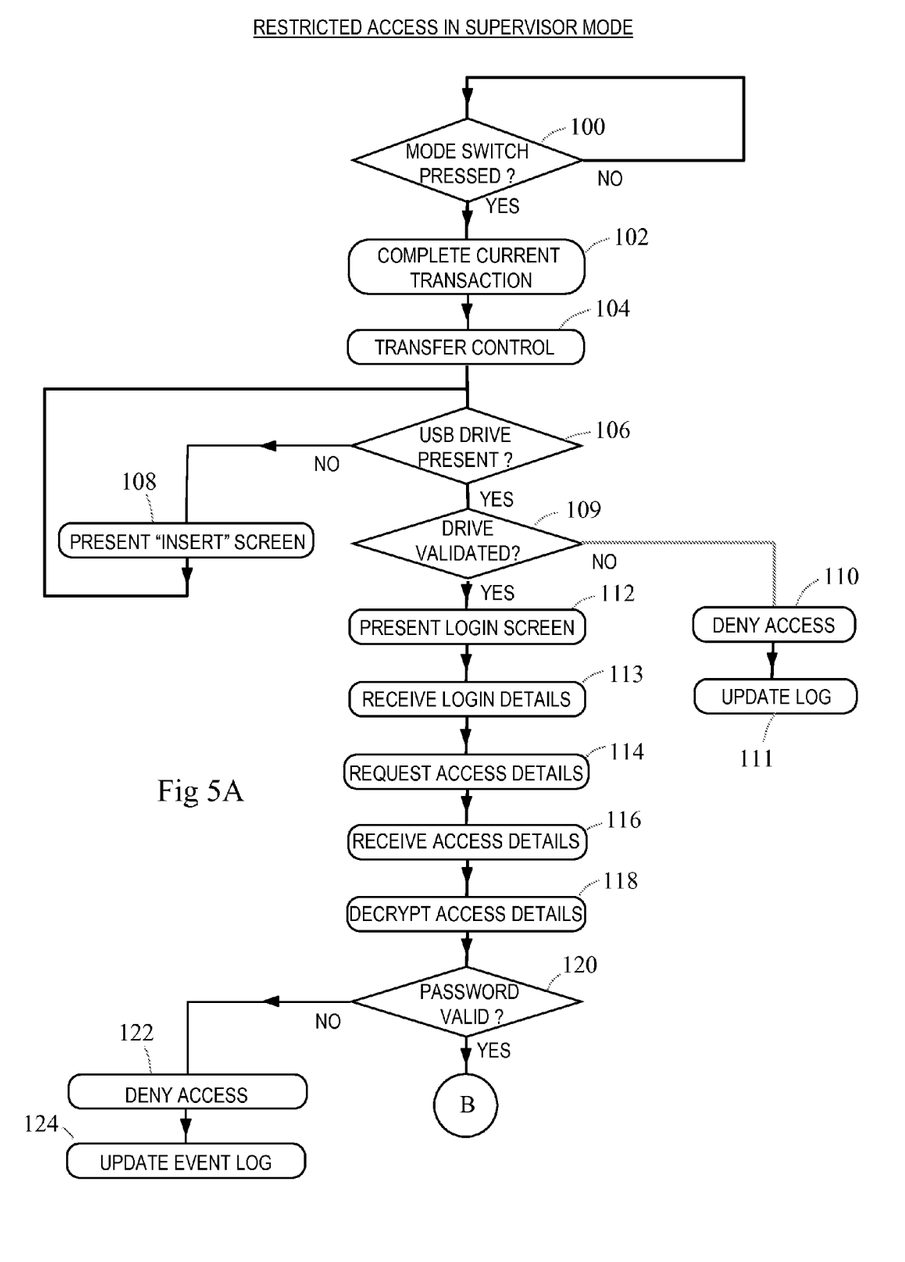
Figure 5B:
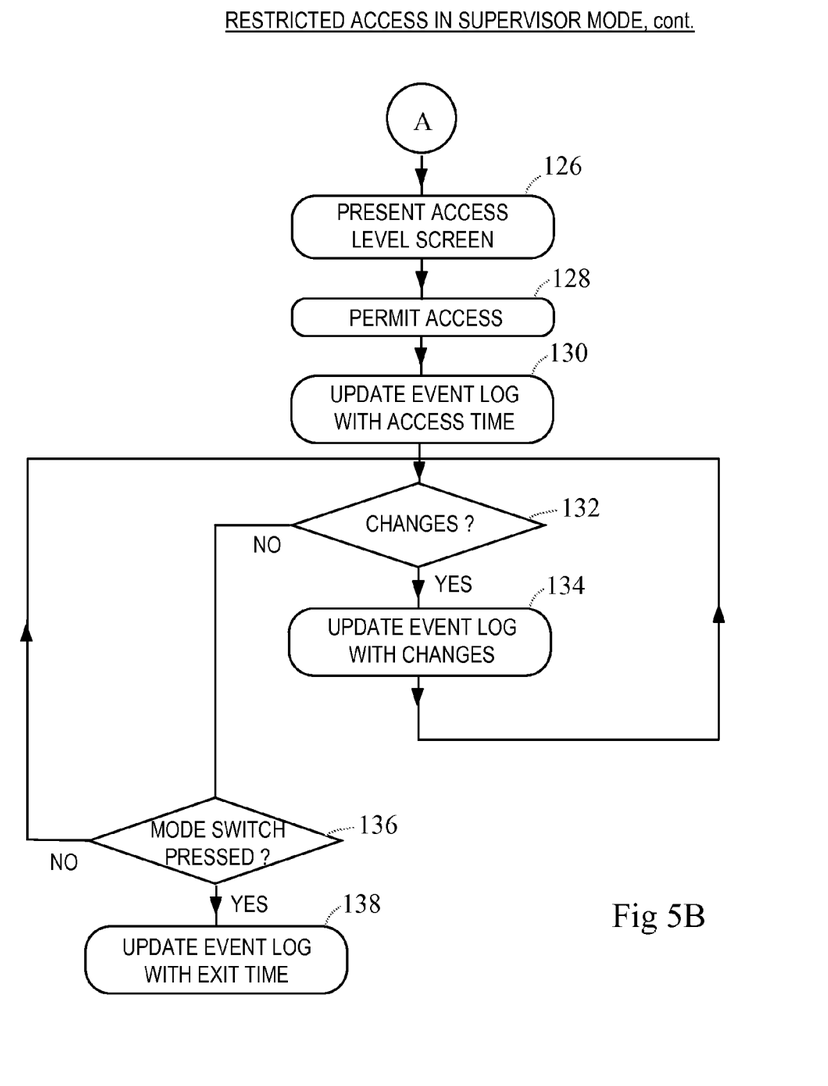
Figure 6:
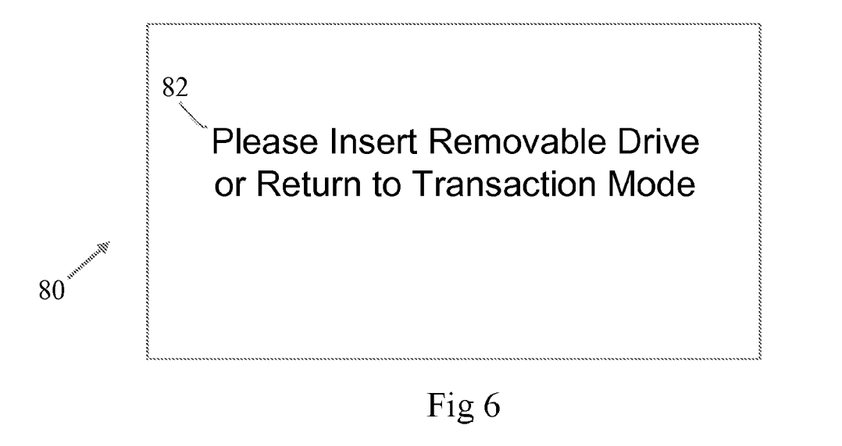
FIG. 6 is a pictorial diagram of a menu screen presented by the SST of FIG. 2 to a service user when the removable storage device of FIG. 2 is not present.

The operation of the ATM 40 in supervisor mode will now be described with reference to FIG. 5, which is a flowchart illustrating steps involved when a service user attempts to access a restricted function of the ATM 40, and also with reference to FIG. 6, which is a pictorial diagram of a menu screen presented on the service user operator panel 48.

Initially, the Control Application 20 detects that the service user has pressed the mode switch 50 to enter supervisor mode (step 100).

The Transaction Application 22 then completes any transaction currently being implemented (step 102) and then transfers control of the ATM 40 to the Supervisor Application (SA) 24 (step 104).

The SA 24 first ascertains if a removable storage device (such as the secure USB drive 54) has been inserted into the USB socket 52 (step 106).

If no removable storage device is present in the USB socket 52, then the SA 24 presents a screen 80 (FIG. 6) including a text prompt 82 inviting the service user to insert a removable storage device (step 108). The SA 14 remains in this state until either a removable storage device is inserted, or the service user moves the switch 50 back to transaction mode.

If a removable storage device (for example, the secure USB drive 54) is present in the USB socket 52, then the SA 24 performs a validity check relating to the secure USB drive 54 (step 109).

This validity check involves the ATM 40 ascertaining if it is configured to communicate with a removable storage device. Some ATMs may not be configured to allow a secure USB drive 54 to be used to authenticate a service person. The SA 24 may include some logic to control whether a removable storage device will be read by the ATM 40.

If the ATM 40 is configured to read a secure USB drive 54, then this validity check also involves reading the time period 76 from the secure USB drive 54. The SA 24 implements this using the security library 26 (which includes the developer identification in the read request) and the custom driver 39.

The secure USB drive 54 receives this request, confirms the validity of the request (by ensuring, inter alia, that the request conforms to the required security protocol, and that the developer identification in the request matches that stored in the secure storage 56) and transmits the stored time period 76 to the SA 24.

If the validity check fails (for example, because the ATM 40 is not configured to read a secure USB drive 54, or the time period has expired, or not started yet, or the ATM clock has been changed), then the SA 24 ignores the secure USB drive 54 (step 110) and updates an event log (step 111).

If the validity check is passed, then the SA 24 presents a login screen 90 (FIG. 7) to the service user (step 112). The login screen 90 includes: a text prompt 92 inviting the service user to enter his/her passcode; and a passcode entry field 94 for receiving the service user's passcode (the login credentials).

Figure 7:
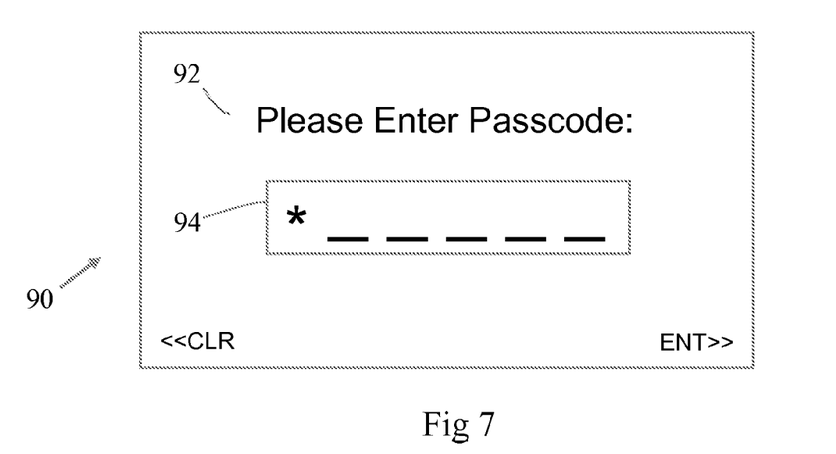
FIG. 7 is a pictorial diagram of a menu screen presented by the SST of FIG. 2 to a service user when the removable storage device of FIG. 2 is present.

The service user types his/her passcode ("583254" in this embodiment) into the passcode entry field 94 using the numeric keypad 49 and selects an "Enter" option via the numeric keypad 49.

The SA 24 receives this information (the entered login credentials) (step 113) and then requests the stored access details from the secure USB drive 54 (step 114), again, using the security library 26 (which includes the developer identification in the read request) and the custom driver 39.

The secure USB drive 54 receives this request, confirms the validity of the request, and transmits the stored access details in encrypted form.

The SA 24 then receives the encrypted access details from the secure USB drive 54 (step 116).

The SA 24 decrypts the received access details (step 118). The SA 24 then compares the login credentials with the access details retrieved from the secure storage 56 (step 120).

If the login credentials do not match those stored in the secure storage, then the SA 24 denies access to the service user (step 122) and writes the username 74, the unique identifier 72, and an error code (indicating the reason for the login failure) to an event log (not shown) indicating that a login failure occurred (step 124). The SA 24 writes this to the event log using a conventional operating system API from the API suite 36 (FIG. 1).

Figure 8:
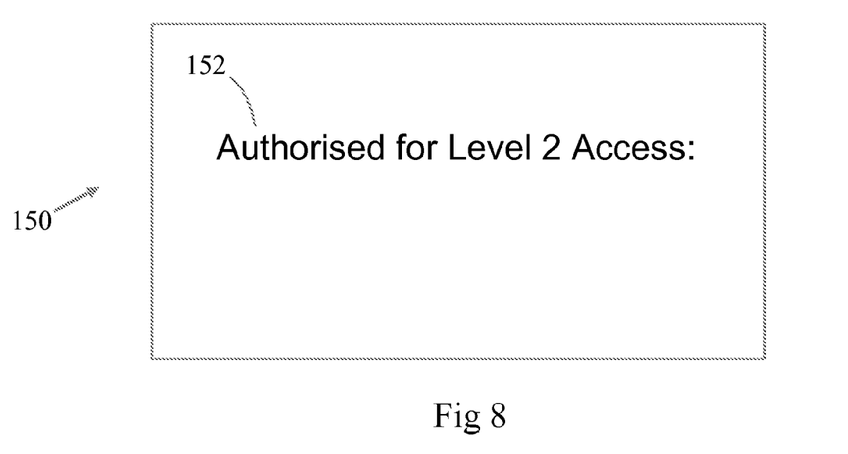
FIG. 8 is a pictorial diagram of a menu screen presented by the SST of FIG. 2 to a service user when the service user has been authenticated by the SST.

If the login credentials match those stored in the secure storage, then the SA 24 presents an authorisation confirmed screen 150 (FIG. 8) having text 152 that indicates to the service user the level of access granted (step 126). The SA 24 also permits access to the service user (step 128) to the extent consistent with the access level for the service user (transmitted as part of the access details). The security library 26 converts the access level codes 78 retrieved from the secure USB drive 54 into codes that the SA 24 recognises. The SA 24 uses these converted codes to configure its menu hierarchy to offer only those menu options to which the service user is authorised by the access level codes 78 in the secure USB drive 54. This enables the ATM 40 to meet the PA-DSS requirements to restrict access to certain menu options to authorised personnel.

The SA 24 also writes details relating to the access to the event log (step 130). These details include the username of the service user, the unique identifier of the secure USB drive 54, and the time at which access was permitted.

During the time when the service user is using the SA 24, the SA 24 continually monitors for restricted function options selected by the service user, and also for changes made by the service user using the restricted function options (step 132).

If the service user does access restricted function options, then the SA 24 updates the event log (step 134) with details of the keystrokes performed and the functions selected by the service user thereby enabling audit of the activities of the service user. During this step, the SA 24 also updates the event log with any changes implemented by the service user.

Writing these details to the event log enables the ATM 40 to meet the PA-DSS requirements to maintain an audit of any servicing personnel who access the menu options restricted to authorised personnel.

The SA 24 also monitors for a change in state of the mode switch 50 (step 136), indicating that the service user has completed all desired tasks and desires to return the ATM 40 to transaction mode in the same manner as for a conventional ATM.

If the state of the mode switch 50 is changed, then the SA 24 updates the event log to record the time and date when the service user exited the SA 24 (step 138), and then transfers control of the ATM back to the Transaction Application 22.

It will now be appreciated that the above embodiment allows an ATM to restrict access to certain functions using a removable storage device. The removable storage device can be securely programmed by an owner of an ATM network, and each authorised service user can be assigned (provided with) a removable storage device with a unique identifier. This enables a service user to be identified based on the removable storage device that is presented by a service user. The removable storage device operates as a security token that is programmed with access permissions and login credentials.

The above embodiment does not have any dependency on a specific operating system or a remote network server to authenticate a service user using two factor authentication. The SST does not need to store a list of authorised service users because the removable storage device stores the required information for each service user.

The event log stores all keystrokes and changes made using the restricted functions, so this can be used, together with the identity of the service user, to audit all changes made to the ATM over time.

Various modifications may be made to the above described embodiment within the scope of the invention, for example, in other embodiments, the SST may be a terminal other than an ATM.

In other embodiments, the software architecture provided may be different to that described above.

In other embodiments, instead of providing a physical mode switch 50, the ATM may detect a request to change modes by, for example, sensing a door being opened, a predefined key on the service user operator panel 48 being pressed, or an icon on a supervisor screen being selected.

In other embodiments, the entire Supervisor Application may not be restricted, only some options of an access menu within the Supervisor Application may be restricted.

In other embodiments, a different type of operating system may be used than that described, for example, a different Microsoft (trade mark) operating system, or a non-Microsoft operating system, such as Linux or Unix.

In the above embodiment, the run-time components 32 are a set of APTRA (trade mark) XFS components; in other embodiments, proprietary (non-XFS) run-time components may be used.

In other embodiments, the Supervisor Application 24 may be separate from the Control Application 20.

In other embodiments, the service user operator panel 48 may comprise a touch-sensitive panel overlying a display; or the customer display may be used as the service operator panel 48.

In other embodiments, instead of, or in addition to, storing individual access level codes, the secure USB drive 54 may store one or more master codes enabling the user to access multiple restricted functions without having to list each restricted function as a separate code.

In other embodiments, the access codes may relate to different levels of access, each level including a plurality of individual access codes. Level one may be for service users authorised to clear jams and replenish non-valuable media, such as receipt paper (referred to as first line maintenance). Level two may be for service users authorised to perform maintenance and diagnostic functions on the modules and devices within the ATM 40 (referred to as second line maintenance). Level three may be for service users who are authorised to replenish valuable media, such as banknotes and coins (referred to as replenishment). Level four may be for service users who are authorised to perform administrative actions, such as loading software.

In other embodiments, the service user may enter a username and a passcode instead of just a passcode.

In other embodiments, a different data structure may be used to store the access details.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of providing secure authentication of a service user at a self-service terminal, the method comprising:

detecting attempted access by the service user to a restricted function on the self-service terminal, wherein detecting further includes identifying the restriction function as particular function including one or more tasks for: changing a password, entering an encryption key, and specifying a particular menu to present on the self-service terminal when a supervisory mode is entered on the self-service terminal;

ascertaining if a removable storage device is connected to a user-accessible data port in a service user interface of the self-service terminal and in communication with the self-service terminal, wherein ascertaining further includes finding out if the removable storage device is connected to the user-accessible data port;

in the event that a removable storage device is not in communication with the self-service terminal, denying access to the restricted function;

in the event that a removable storage device is in communication with the self-service terminal, prompting the service user to enter login credentials;

comparing the entered login credentials with access details stored on the removable storage device;

denying access to the restricted function if the entered login credentials do not comply with the access details;

permitting access to the restricted function if the login credentials do comply with the access details; and storing details relating to the access.

2. A method according to claim 1, wherein the step of detecting attempted access by the service user to a restricted function on the self-service terminal is implemented by detecting a state of a switch being changed.

3. A method according to claim 1, wherein the step of ascertaining if a removable storage device is in communication with the self-service terminal is implemented by the self-service terminal detecting the removable storage device being present in a slot defined by the terminal.

4. A method according to claim 1, wherein the step of ascertaining if a removable storage device is in communication with the self-service terminal is implemented by the self-service terminal detecting a wireless communication session with the removable storage device.

5. A method according to claim 1, wherein the step of denying access to the restricted function is implemented by denying access to software that includes the restricted function.

6. A method according to claim 1, wherein the step of denying access to the restricted function is implemented by allowing access to software that includes the restriction function, but not allowing access to that restricted function.

7. A method according to claim 1, wherein the method comprises the further step of receiving the access details from the removable storage device prior to the step of comparing the entered login credentials with the access details stored on the removable storage device.

8. A method according to claim 1, wherein the method comprises the further step of transmitting the entered login credentials to the removable storage device prior to the step of comparing the entered login credentials with the access details stored on the removable storage device.

9. A method according to claim 1, wherein the access level relates to first level maintenance, second level maintenance, administrative, and replenishment.

10. A method according to claim 1, wherein the removable storage device includes a secure memory.

11. A method according to claim 10, wherein the secure memory stores a unique identifier for the removable storage device and a unique identifier for a service user authorised to use the removable storage device.

12. A computer program for implementing the steps of claim 1.

13. A computer program according to claim 12, wherein the computer program is stored in a computer memory.

14. A self-service terminal comprising: a customer display; a storage device located within the terminal; and a processor for controlling the terminal; the processor being operable to load instructions from the storage device to execute:

(a) a runtime platform operable to (i) detect attempted access by the service user to a restricted function on the self-service terminal, wherein the restricted function includes one or more tasks for: changing a password, entering an encryption key, and specifying a particular menu to present on the self-service terminal when a supervisory mode is entered on the self-service terminal, and (ii) ascertain if a removable storage device is connected to a user-accessible data port in a service user interface of the self-service terminal and in communication with the self-service terminal, wherein (ii) further includes to find out if removable storage device is connected to a user-accessible data port; and (b) a supervisor application arranged to: (i) receive login credentials from a service user when the removable storage device is connected to the user-accessible data port, (ii) compare the received login credentials with access details stored on a removable storage device provided by the service user, (iii) permit the service user to access a restricted function of the supervisor application in the event that the received login credentials comply with the access details stored on the removable storage device, (iv) store details relating to the service user's access, and v) deny access to the restricted function when the removable storage device is not connected to the user-accessible data port.

15. A self-service terminal according to claim 14, wherein the terminal further comprises a transaction application operable to provide a sequence of transaction screens to a customer to enable that customer to execute a transaction at the self-service terminal.

* * * * *